(12) United States Patent
Seguchi et al.

(10) Patent No.: US 11,069,905 B2
(45) Date of Patent: Jul. 20, 2021

(54) FUEL CELL SEPARATOR

(71) Applicant: TOYOTA JIDOSHA KABUSHIKI KAISHA, Toyota (JP)

(72) Inventors: Tsuyoshi Seguchi, Toyota (JP); Koutaro Ikeda, Susono (JP); Yukihiro Shibata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/216,033

(22) Filed: Dec. 11, 2018

(65) Prior Publication Data

US 2019/0190035 A1 Jun. 20, 2019

(30) Foreign Application Priority Data

Dec. 14, 2017 (JP) .............................. JP2017-239807

(51) Int. Cl.
*H01M 8/0206* (2016.01)
*H01M 8/0228* (2016.01)
(Continued)

(52) U.S. Cl.
CPC ....... *H01M 8/0206* (2013.01); *H01M 8/0213* (2013.01); *H01M 8/0228* (2013.01);
(Continued)

(58) Field of Classification Search
None
See application file for complete search history.

(56) References Cited

U.S. PATENT DOCUMENTS

2012/0088185 A1 4/2012 Maeda et al.
2013/0164654 A1 6/2013 Suzuki et al.
(Continued)

FOREIGN PATENT DOCUMENTS

JP 2002-170582 A 6/2002
JP 4825894 9/2011
(Continued)

OTHER PUBLICATIONS

Pierson, Hugh O., Handbook of Chemical Vapor Deposition: Principles, Technology and Applications, 1999, pp. 26-27 (Year: 1999).*

*Primary Examiner* — Carmen V Lyles-Irving
(74) *Attorney, Agent, or Firm* — Finnegan, Henderson, Farabow, Garrett & Dunner, LLP

(57) ABSTRACT

A method for manufacturing a fuel cell separator that ensures an improved corrosion resistance under usage environment of a fuel cell and restraining an increase of a contact resistance with a power generation unit by enhancing a sticking force of a conductive carbon film formed on a surface in contact with the power generation unit on a surface of a titanium substrate is provided. It is a method for manufacturing a fuel cell separator. The fuel cell separator includes a contact portion that is in contact with a power generation unit so as to partition the power generation units including electrodes of the fuel cell, and includes a conductive carbon film formed on the contact portion. First, a titanium substrate that has a plurality of projecting portions formed corresponding to a shape of the contact portion and recessed portions for gas flow channels formed between the projecting portions are prepared as a substrate of the separator. Next, a heat treatment is performed on the titanium substrate in a state where a carbon sheet is brought in contact with the projecting portions such that carbon of the carbon sheet diffuses in the projecting portions.

4 Claims, 9 Drawing Sheets

(51) Int. Cl.
   *H01M 8/0213*   (2016.01)
   *H01M 8/0232*   (2016.01)
   *H01M 8/0247*   (2016.01)
   *H01M 8/1004*   (2016.01)
   *H01M 8/0254*   (2016.01)
   *H01M 8/1018*   (2016.01)

(52) U.S. Cl.
   CPC ....... *H01M 8/0232* (2013.01); *H01M 8/0247* (2013.01); *H01M 8/1004* (2013.01); *H01M 8/0254* (2013.01); *H01M 2008/1095* (2013.01); *H01M 2250/20* (2013.01)

(56) References Cited

U.S. PATENT DOCUMENTS

| | | |
|---|---|---|
| 2014/0356764 A1 | 12/2014 | Iseki et al. |
| 2015/0325863 A1 | 11/2015 | Takada et al. |
| 2016/0087287 A1* | 3/2016 | Koizumi ............. H01M 8/0206 427/535 |
| 2016/0268611 A1 | 9/2016 | Suzuki et al. |

FOREIGN PATENT DOCUMENTS

| | | |
|---|---|---|
| JP | 2012-028046 | 2/2012 |
| JP | 2012-028047 A | 2/2012 |
| JP | 2012-043775 | 3/2012 |
| JP | 2012-234694 A | 11/2012 |
| JP | 2013-155406 | 8/2013 |
| JP | 2014-078468 | 5/2014 |
| JP | 2014-146550 | 8/2014 |
| JP | 2015-095314 A | 5/2015 |
| KR | 10-2015-0100898 A | 9/2015 |

\* cited by examiner

Magnification of 30,000 times

Magnification of 30,000 times

Magnification of 2,000,000 times

Magnification of 2,000,000 times

FUEL CELL SEPARATOR

CROSS REFERENCE TO RELATED APPLICATIONS

The present application claims priority from Japanese patent application JP 2017-239807 filed on Dec. 14, 2017, the content of which is hereby incorporated by reference into this application.

BACKGROUND

Technical Field

The present disclosure relates to a method for manufacturing a fuel cell separator that is in contact with a power generation unit so as to partition the power generation units including electrodes of the fuel cell.

Background Art

In a fuel cell, conventionally, a power generation unit that includes a membrane electrode assembly in which a pair of electrodes are formed on both surfaces of a solid polymer electrolyte membrane is regarded as a single cell. The power generation units are partitioned by separators with which gas flow channels for, for example, a hydrogen gas as a fuel gas and an oxidant gas, such as an air, are formed. The fuel cell is configured as a stack in which a plurality of single cells are stacked via the separators. Such a fuel cell separator has a role to cause a current generated in the stack to flow to an adjacent cell, and therefore, high conductive property and conductive durability are desired.

As a method for manufacturing such a fuel cell separator, for example, JP 2013-155406 A and Japanese Patent No. 4825894 have proposed a method for manufacturing a fuel cell separator that forms a conductive carbon film, such as amorphous carbon, on a surface in contact with the power generation unit on a surface of a titanium substrate in which the gas flow channels are formed.

SUMMARY

However, the separators obtained by the manufacturing methods described in JP 2013-155406 A and Japanese Patent No. 4825894 possibly have a region with a low sticking force between a titanium substrate and a conductive carbon film. This region with the low sticking force has a concern that an interface between the titanium substrate and the conductive carbon film is easily oxidized and a contact resistance between the separator and the power generation unit increases under usage environment of the fuel cell.

The present disclosure has been made in view of such an aspect, and provides a method for manufacturing a fuel cell separator that ensures an improved corrosion resistance under usage environment of a fuel cell by enhancing a sticking force of a conductive carbon film formed on a surface in contact with a power generation unit on a surface of a titanium substrate.

In view of the above-described problem, a method for manufacturing a fuel cell separator according to the present disclosure is a method for manufacturing a fuel cell separator that includes a contact portion that is in contact with a power generation unit so as to partition the power generation units including electrodes of a fuel cell, and has a conductive carbon film formed on the contact portion. The method includes: preparing a titanium substrate having a plurality of projecting portions and recessed portions for gas flow channels as a substrate of the separator, the projecting portions being formed corresponding to a shape of the contact portion, the recessed portions being formed between the projecting portions; and performing a heat treatment on the titanium substrate in a state where a carbon sheet is brought in contact with the projecting portions such that carbon in the carbon sheet diffuses in the projecting portions.

According to the present disclosure, performing the heat treatment in a state where the carbon sheet is brought in contact with at least the projecting portions of the titanium substrate ensures diffusing the carbon of the carbon sheet in the matrix material of the titanium substrate on the surface of the contact portions of the titanium substrate. This ensures forming the titanium carbide layer such that the titanium carbide layer uniformly covers the surface of the matrix material of the titanium substrate.

Thus forming the titanium carbide layer on the surface of the matrix material of the projecting portions ensures forming the conductive carbon film on the surface of the titanium carbide layer in the later step such that a contact portion with an enhanced sticking force between the projecting portion of the titanium substrate and the conductive carbon film can be obtained. In particular, in this embodiment, the carbon sheet has flexibility, and thus, the carbon sheet can be easily caused to follow the surfaces of the projecting portions on the surface of the titanium substrate and the heat treatment can be performed in this state. This ensures further uniformly forming the titanium carbide layer with reduced unevenness.

In one aspect, forming the conductive carbon film on the projecting portions after the performing the heat treatment may be included. This aspect ensures enhancing the sticking force between the titanium carbide layer and the conductive carbon film by the binding between the carbon of the titanium carbide layer of the contact portion and the carbon of the conductive carbon film. In particular, forming the conductive carbon film by the plasma CVD ensures further enhancing the binding force between the carbon of the titanium carbide layer and the carbon of the conductive carbon film.

Here, for example, while a passive film of the titanium substrate may be removed in advance by etching before the performing the heat treatment, etching the projecting portions after the performing the heat treatment and before the forming the film may remove the passive films of the titanium oxide formed on the surfaces of the projecting portions in one aspect. According to this aspect, as described later, a film thickness of the passive film of the titanium oxide on which performing the heat treatment has been performed is thinner than a film thickness of the passive film of the titanium oxide on which the performing the heat treatment has not been performed, and thus, the etching time can be shortened.

Yet in some aspects, the preparing the substrate includes forming the titanium substrate by a presswork. According to this aspect, in the performing the heat treatment, the titanium substrate is formed by the press forming before the titanium carbide layer is formed, and thus, the projecting portions and the recessed portions can be easily formed from the titanium substrate high in formability.

The heat treatment may be performed in a state where the titanium substrates and the carbon sheets are alternately stacked in the performing the heat treatment. According to this aspect, the heat treatment can be performed while both surfaces of the carbon sheet are brought in contact with the projecting portions of the titanium substrate by alternately stacking the titanium substrates and the carbon sheets. This ensures enhancing productivity of the separator.

With the present disclosure, enhancing the sticking force of the conductive carbon film formed on the surface that is in contact with the power generation unit on the surface of the titanium substrate ensures the improved corrosion resistance under the usage environment of the fuel cell and restraining the increase of the contact resistance with the power generation unit.

DETAILED DESCRIPTION

Figure 1:
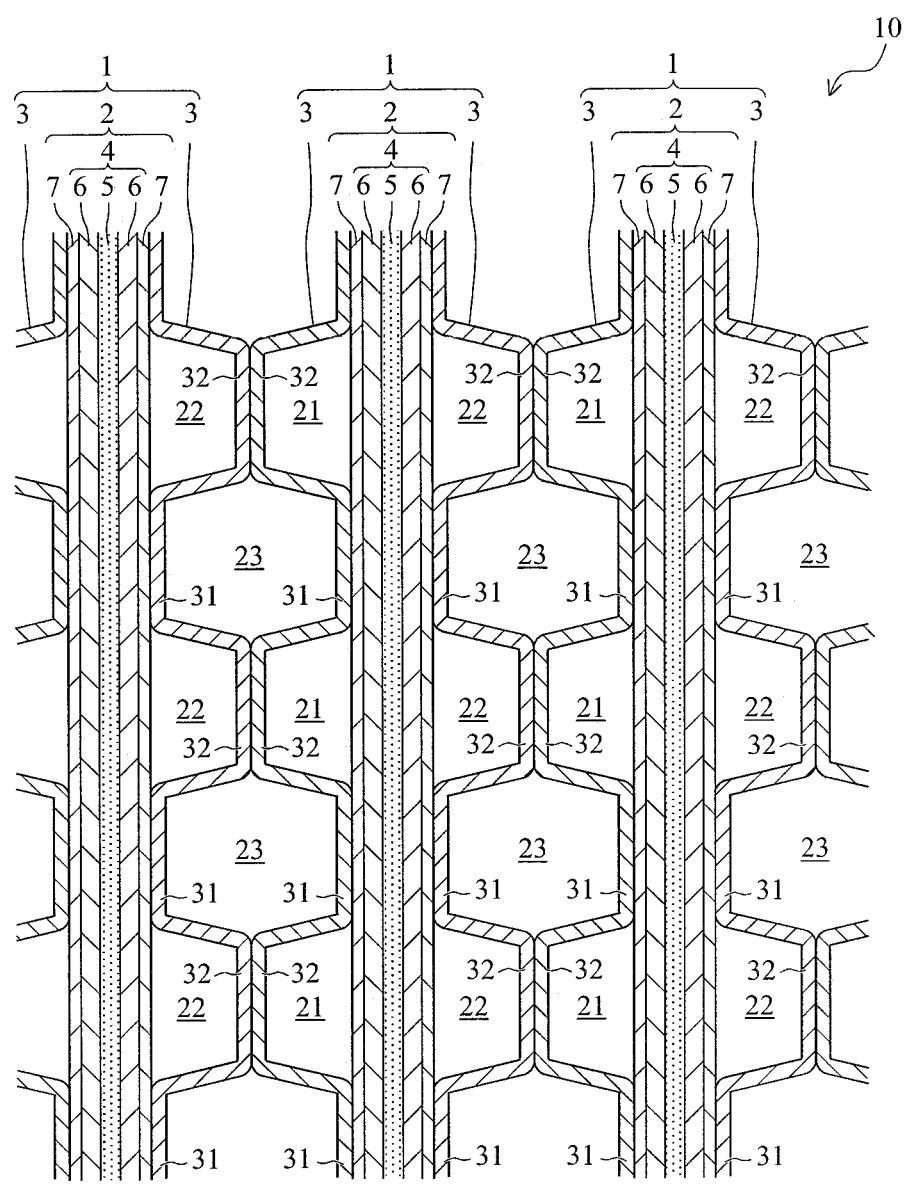
FIG. 1 is a schematic cross-sectional view of a main part of a fuel cell that includes separators according to an embodiment of the present disclosure.

The following describes a configuration of the present disclosure in detail based on an exemplary embodiment illustrated in the drawings. While the following exemplarily describes a case where the present disclosure is applied to a fuel cell mounted on a fuel cell vehicle or a fuel cell system including the fuel cell as one example, the scope of application is not limited to such an example.

1. Fuel Cell 10 Including Separator 3

FIG. 1 is a schematic cross-sectional view of a main part of a fuel cell 10 including separators 3 according to an embodiment of the present disclosure. As illustrated in FIG. 1, in the fuel cell (fuel cell stack) 10, a plurality of cells 1 are stacked. The cell 1 is a basic unit. Each of the cells 1 is a solid polymer fuel cell that generates an electromotive force by an electrochemical reaction between an oxidant gas (for example, air) and a fuel gas (for example, a hydrogen gas). The cell 1 includes a Membrane Electrode & Gas Diffusion Layer Assembly (MEGA) 2 and the separators (fuel cell separator) 3 that are in contact with the MEGAs 2 so as to partition the MEGAs (power generation unit) 2. It should be noted that, in this embodiment, the MEGA 2 is sandwiched by a pair of the separators 3 and 3.

The MEGA 2 is made by integrating a membrane electrode assembly (MEA) 4 and gas diffusion layers 7 and 7, which are disposed on both sides of the membrane electrode assembly 4. The membrane electrode assembly 4 is made of an electrolyte membrane 5 and a pair of electrodes 6 and 6 bonded so as to sandwich the electrolyte membrane 5. The electrolyte membrane 5 includes a proton-conductive ion exchange membrane formed of a solid polymer material. The electrode 6 is formed of, for example, a porous carbon material carrying a catalyst, such as platinum. The electrode 6 disposed at one side of the electrolyte membrane 5 becomes an anode and the electrode 6 on the other side becomes a cathode. The gas diffusion layer 7 is formed of a conductive member with gas permeability, such as a carbon porous body, such as a carbon paper or a carbon cloth, or a metal porous body, such as a metal mesh or a porosity metal.

In this embodiment, the MEGA 2 is a power generation unit of the fuel cell 10. The separator 3 is in contact with the gas diffusion layer 7 of the MEGA 2. When the gas diffusion layer 7 is omitted, the membrane electrode assembly 4 is the power generation unit, and in this case, the separator 3 is in contact with the membrane electrode assembly 4. Accordingly, the power generation unit of the fuel cell 10 includes the membrane electrode assembly 4 and is in contact with the separator 3. The separator 3 is a plate-shaped member that uses metal high in conductivity and gas impermeability as a substrate. The separator 3 has contact portions 31 on one surface side of the separator 3 and contact portions 32 on the other surface side of the separator 3. The contact portion 31 abuts on the gas diffusion layer 7 of the MEGA 2. The contact portion 32 abuts on the other surface side of adjacent another separator 3. The contact portions 31 and 32 are power collection portions that collect electric power generated in the MEGA 2 as the power generation unit.

In this embodiment, each of the separators 3 is formed into a wave form. The shape of the separator 3 is that a shape of a wave forms an isosceles trapezoid and a top portion of the wave is flat. This top portion has both ends forming equal angles to provide angular shapes. That is, each of the separators 3 presents an approximately identical shape whether it is viewed from a front side or a back side, and these top portions (projecting portion) become the contact portions 31 and 32 of the separator 3. Specifically, the contact portions 31 as the top portions of the separator 3 are in surface contact with one gas diffusion layer 7 of the MEGA 2, and the contact portions 32 as the top portions of the separator 3 are in surface contact with the other gas diffusion layer 7 of the MEGA 2.

A gas flow channel 21 defined between the gas diffusion layer 7 on a side of one electrode (that is, anode) 6 and the separator 3 is a flow passage through which a fuel gas passes. A gas flow channel 22 defined between the gas diffusion layer 7 on a side of the other electrode (that is, cathode) 6 and the separator 3 is a flow passage through which an oxidant gas passes. When the fuel gas is supplied to the gas flow channel 21 on one side and the oxidant gas is supplied to the gas flow channel 22 on the other side, an electrochemical reaction occurs inside the cell 1 to generate an electromotive force. The gas flow channel 21 and the gas flow channel 22 oppose via the cell 1.

Furthermore, a certain cell 1 and another cell 1 adjacent to the certain cell 1 are disposed such that the electrode 6 as the anode and the electrode 6 as the cathode face one another. The contact portions 32 on a back side of the separator 3 disposed along the electrode 6 as the anode of the certain cell 1 are in surface contact with the contact portions 32 on the back side of the separator 3 disposed along the electrode 6 as the cathode of the another cell 1. A space 23 defined between the separators 3 and 3 that are in surface contact between the adjacent two cells 1 has a water as a coolant to cool the cell 1 passing through.

2. Method for Manufacturing Separator 3

Figure 2:
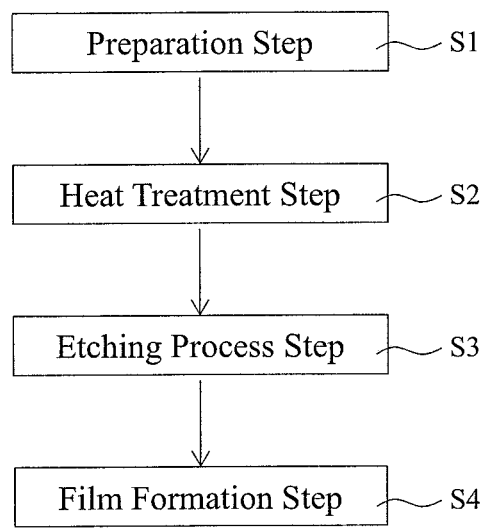
FIG. 2 is a flowchart for describing a method for manufacturing the fuel cell separator illustrated in FIG. 1.

The following describes a method for manufacturing the separator 3 according to the embodiment with reference to FIG. 2 to FIG. 8. FIG. 2 is a flowchart for describing the method for manufacturing the fuel cell separator 3 illustrated in FIG. 1. It should be noted that, while the following describes the method for manufacturing the separator 3 in which the gas flow channel 21 for the fuel gas is formed, the method for manufacturing the separator 3 in which the gas flow channel 22 for the oxidant gas is formed is similar, and thus, the detailed description will not be further elaborated here.

2-1. Preparation Step S1

Figure 3:
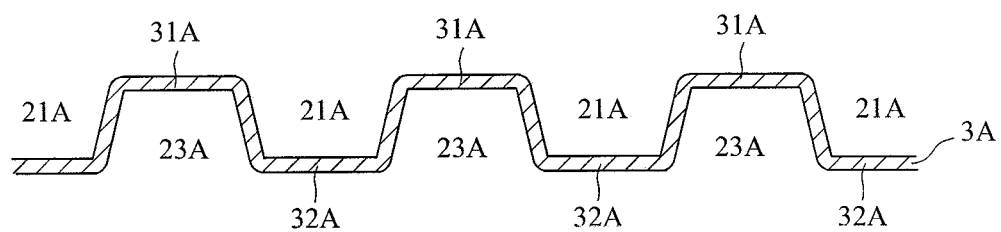
FIG. 3 is a schematic cross-sectional view of a titanium substrate that becomes a substrate for the separator in a preparation step illustrated in FIG. 2.
Figure 4:
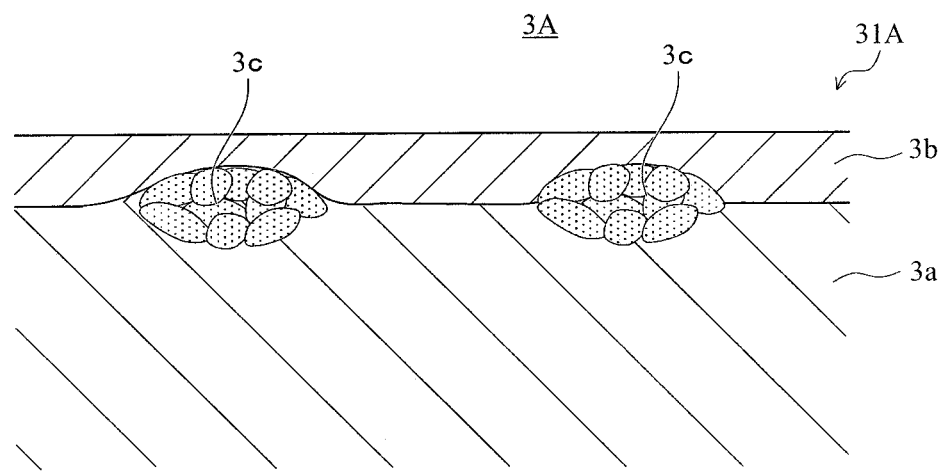
FIG. 4 is an enlarged cross-sectional view of a projecting portion illustrated in FIG. 3.

FIG. 3 is a schematic cross-sectional view of a titanium substrate 3A that becomes a substrate of the separator 3 in the preparation step illustrated in FIG. 2. FIG. 4 is an enlarged cross-sectional view of a projecting portion 31A illustrated in FIG. 3. As illustrated in FIG. 2, in this embodiment, the preparation step S1 is firstly performed.

At the preparation step S1, the titanium substrate 3A is prepared as the substrate of the separator 3. The titanium substrate 3A has a plurality of the projecting portions 31A, 31A, . . . formed corresponding to a shape of the contact portions 31 and recessed portions 21A for the gas flow channels formed between the projecting portions 31A and 31A. It should be noted that, on an opposite side of a surface on which the projecting portions 31A are formed, projecting portions 32A corresponding to a shape of the contact portions 32 are formed. Recessed portions 23A for a cooling water are formed between the projecting portions 32A and 32A. In this embodiment, a sheet-shaped titanium substrate described below is prepared, and then, a presswork is performed onto this titanium substrate to form the titanium substrate 3A. The following describes the detail.

In this step, the sheet-shaped titanium substrate made of a cold rolled material is firstly prepared. The titanium substrate is made of titanium or titanium alloy. The titanium can include, for example, types 1 to 4 (corresponding to grades 1 to 4 of ASTM) specified in Japanese Industrial Standard H 4600. The titanium alloy can include, for example, Ti—Al, Ti—Nb, Ti—Ta, Ti—6Al—4V, and Ti—Pd. However, it is not limited to the above-described examples in any case.

Using the substrate made of the titanium or the titanium alloy ensures a light weight and a high corrosion resistance. In some embodiments, the titanium substrate is a cold plate material having a thickness of 0.05 to 1 mm. The thickness in this range satisfies a request of weight reduction and thinning of the separator, and provides strength and handleability as the separator; therefore, it is relatively easy to press into the shape of the separator.

The presswork onto the sheet-shaped titanium substrate forms the plurality of projecting portions 31A, 31A, . . . formed corresponding to the shape of the contact portions 31 and the recessed portions 21A for the gas flow channels formed between the projecting portions 31A and 31A from the sheet-shaped titanium substrate. Before a titanium carbide layer 3d in a heat treatment step S2 described later is formed, the titanium substrate 3A is formed by the presswork. Therefore, the projecting portions 31A, the recessed portions 21A, and similar portions can be easily formed from the titanium substrate high in formability.

Here, on the surface of the titanium substrate 3A, a passive film 3b of titanium oxide (specifically, $TiO_2$) is formed as illustrated in FIG. 4. This passive film 3b is an oxide film made of titanium dioxide that is titanium naturally oxidized in the atmosphere (under the atmosphere containing an oxygen gas). Furthermore, between the passive film 3b of the titanium oxide and a matrix material 3a, titanium carbides 3c are locally formed partially. This titanium carbide 3c is carbon of hydrocarbon that has diffused in the titanium when being annealed after being rolled. The hydrocarbon is contained in a rolling oil when the sheet-shaped titanium substrate 3A is rolled.

2-2. Heat Treatment Step S2

Figure 5:
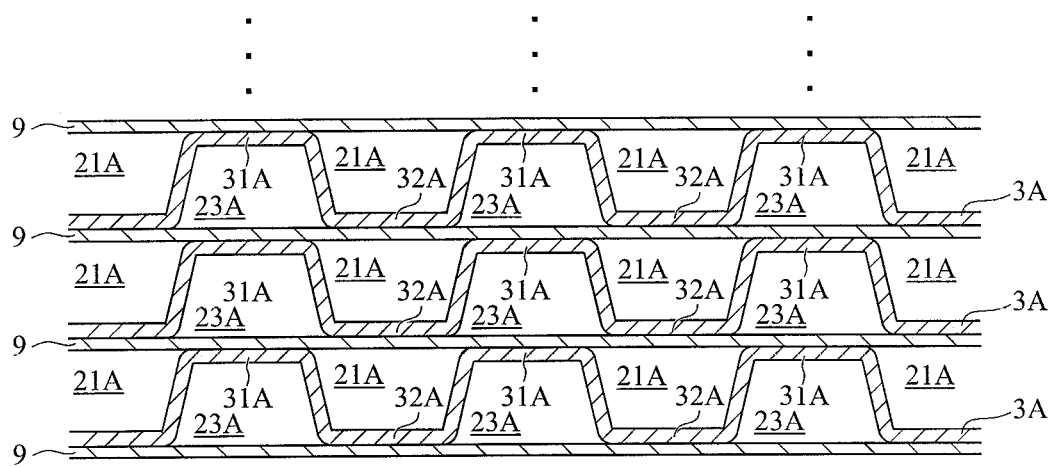
FIG. 5 is a drawing for describing a heat treatment step illustrated in FIG. 2.
Figure 6:
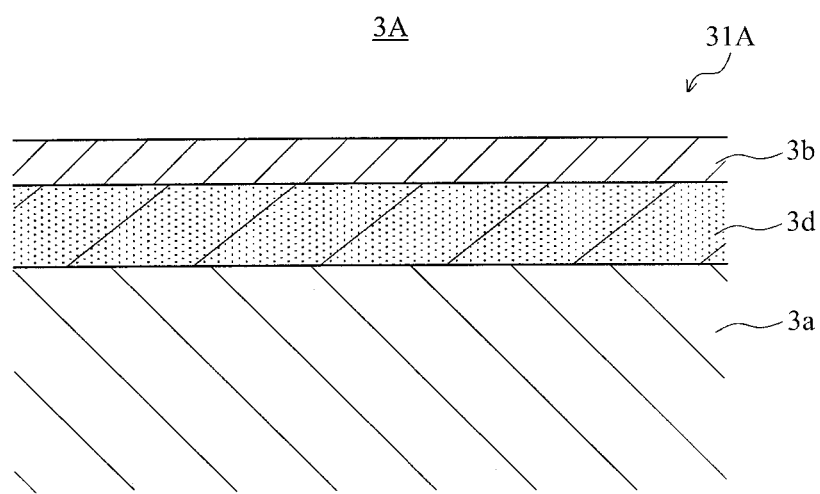
FIG. 6 is an enlarged cross-sectional view of the projecting portion after the heat treatment step illustrated in FIG. 5.

Next, the heat treatment step S2 is performed. FIG. 5 is a drawing for describing the heat treatment step S2 illustrated in FIG. 2. FIG. 6 is an enlarged cross-sectional view of the projecting portion after the heat treatment step S2 illustrated in FIG. 5. In the heat treatment step S2, in a state where a carbon sheet 9 is in contact with the projecting portions 31A, which correspond to the contact portions 31 in contact with at least the power generation unit 2 on the titanium substrate 3A, the heat treatment is performed on the titanium substrate 3A such that the carbon in the carbon sheet 9 diffuses in the projecting portions 31A. It should be noted that, in this embodiment, a similar treatment is simultaneously performed in a state where the carbon sheet 9 is brought in contact with the projecting portions 32A formed on the opposite side.

It is only necessary that the carbon sheet 9 is a flexible sheet whose surface includes carbon, and it is not specifically limited as long as the titanium carbide layer can be formed. The sheet material can include, for example, a carbon paper, a carbon cloth, or a carbon felt, and the material is not specifically limited as long as the material uniformly contacts the surfaces of the projecting portions 31A. For example, the carbon sheet 9 may be a sheet that uniformly carries carbon particles, such as carbon black, on both surfaces of a paper material or a resin sheet. In addition to this, the carbon sheet 9 may be, for example, a sheet-shaped fabric or nonwoven fabric of carbon fibers, or may be the sheet-shaped fabric or nonwoven fabric of carbon fibers impregnated with resin.

In this embodiment, as illustrated in FIG. 5, the heat treatment is performed in a state where the titanium substrates 3A and the carbon sheets 9 are alternately stacked in the heat treatment step S2. This ensures performing the heat treatment on a plurality of the titanium substrate 3A at once, thereby ensuring enhanced productivity. In this embodiment, more specifically, the carbon sheet 9 is interposed such that the projecting portions 31A of the titanium substrate 3A positioned in a lower section opposes the recessed portions 23A of the titanium substrate 3A positioned in an upper section. This can bring the carbon sheet 9 with flexibility in contact with the projecting portions 31A so as to follow the surfaces of the projecting portions 31A. As a result, the heat treatment described later can uniformly diffuse the carbon in the projecting portions 31A. It should be noted that a part of the projecting portions 31A in the lower section may get into the recessed portions 23A in the upper section with the carbon sheet 9 interposed in between. The carbon sheet 9 may be reused after the heat treatment step S2.

Here, in the heat treatment step S2, the titanium substrates 3A and the carbon sheets 9 are put into a heating furnace in a state where the titanium substrates 3A and the carbon sheets 9 are stacked as illustrated in FIG. 5, and then, the heat treatment is performed on the titanium substrates 3A such that the carbon of the carbon sheets 9 diffuses in the projecting portions 31A. In view of this, the titanium carbide layer 3d is uniformly formed on the surface of the matrix material 3a of the titanium substrate 3A as illustrated in FIG. 6. It should be noted that the passive film 3b made of the titanium dioxide formed by the natural oxidization of the titanium resides on the surface of the titanium carbide layer 3d.

Specifically, with the heat treatment step S2, the carbon in the titanium carbide 3c that has partially existed as illustrated in FIG. 4 is diffused in the matrix material 3a of the titanium substrate 3A and vanished by the diffusion of the carbon from the carbon sheet 9. Thus, the titanium carbide layer 3d is uniformly formed on the surface of the matrix material 3a of the titanium substrate 3A.

Furthermore, in this heat treatment step S2, forming the titanium carbide layer 3d causes a film thickness of the passive film 3b formed on the surface of the titanium carbide layer 3d illustrated in FIG. 6 to be thinner than a thickness of the passive film 3b formed on the titanium substrate 3A illustrated in FIG. 4. This is considered due to the titanium carbide having a less activity than the titanium, and therefore, its oxidation is less likely to occur on the surface of the titanium carbide layer 3d compared with on the surface of the matrix material 3a.

It should be noted that this heat treatment decreases the film thickness of the passive film 3b compared with the time of the preparation step S1; therefore, the passive film 3b may be approximately vanished with a treatment condition of the heat treatment step S2 or the passive film 3b may be removed by an etching process at the preparation step S1 and the heat treatment step S2 may be performed in this state. In some cases, this can omit an etching process step S3 described later.

In the above-described heat treatment, the atmosphere condition is not specifically limited as long as the carbon in the carbon sheet 9 can be diffused in the titanium substrate 3A, however, in some embodiments, they are heated under an oxygen-free atmosphere (yet in other embodiments, under a vacuum atmosphere). Here, under the vacuum atmosphere is, for example, under a pressure atmosphere of $1.0 \times 10^{-2}$ Pa or less. This ensures further accelerating the diffusion of the carbon of the carbon sheet 9 into the titanium substrate 3A.

As for the heat treatment condition in the above-described heat treatment, the condition is not specifically limited as long as the carbon of the carbon sheet 9 can be diffused in the titanium substrate 3A, however, in some embodiments, the heating condition has a heating temperature of 500° C. to 650° C. and a heating period of two to four hours. Performing the heat treatment under such a heating condition easily diffuses the carbon of the carbon sheet 9 into the titanium substrate 3A.

Here, when the heating temperature exceeds 650° C., a vaporization of the carbon and the diffusion of the carbon into the matrix material 3a of the titanium substrate 3A become active, and thus, in some cases, the titanium carbide layer 3d is difficult to be formed. Meanwhile, when the heating temperature is less than 500° C., the diffusion of the carbon into the matrix material 3a of the titanium substrate 3A is not sufficient, and thus, it takes time to form the titanium carbide layer 3d.

Here, when the heating period exceeds four hours, the titanium substrate 3A disposed in the lower section possibly deforms by their own weight of the titanium substrate 3A and the carbon sheet 9 in some cases. Meanwhile, when the heating period is less than two hours, the diffusion of the carbon into the matrix material 3a of the titanium substrate 3A is possibly insufficient in some cases.

2-3. Etching Process Step S3

Next, an etching process step S3 is performed. In the etching process step S3, the projecting portions 31A and 32A are etched after the heat treatment step S2 and before a film formation step S4 described later. This removes the passive films 3b of the titanium oxide formed on the surfaces of the projecting portions 31A and 32A.

Figure 7:
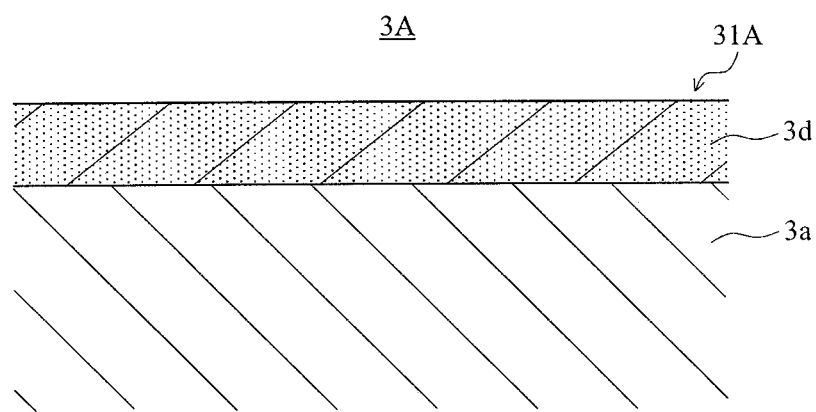
FIG. 7 is a schematic cross-sectional view for describing an etching process step illustrated in FIG. 2.
Figure 8:
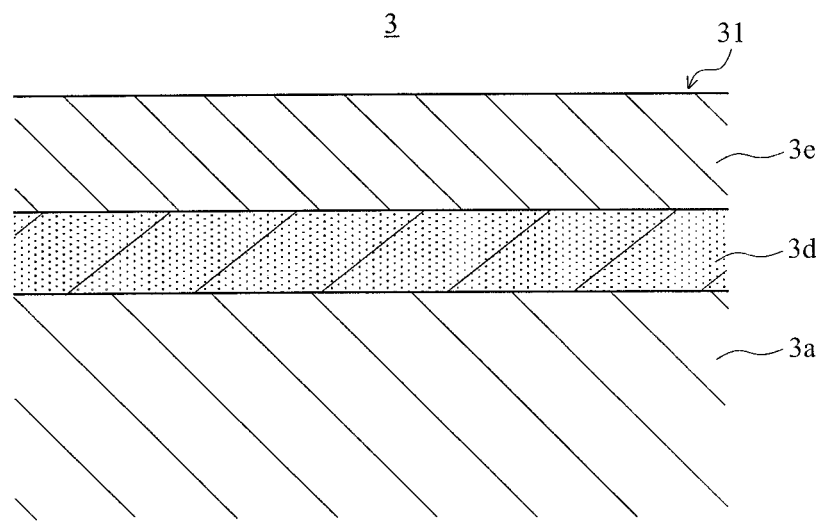
FIG. 8 is a schematic cross-sectional view for describing a film formation step illustrated in FIG. 2.

In view of such a result, the titanium carbide layer 3d can be exposed on the surface of the contact portions 32 of the titanium substrate 3A as illustrated in FIG. 7. Furthermore, as described above, the film thickness of the passive film 3b of the titanium oxide on which the heat treatment step S2 is performed is thinner than the film thickness of the passive film 3b without the heat treatment step S2, thereby ensuring shortening the etching period.

As long as the passive film 3b can be removed and the oxide film, such as the passive film, is not newly formed, the etching may be any one of, for example, a dry etching that uses, for example, plasma, or a wet etching that immerses it in an acidic solution, such as a sulfuric acid solution. In this embodiment, etching by the plasma is performed as one aspect. Specifically, the titanium substrate 3A is put in under a depressurized atmosphere, and elements derived from an inert gas, such as an argon gas turned into plasma, are brought in contact with the surface. This removes the passive film 3b from the titanium substrate 3A. Performing such an etching ensures easily removing the passive film 3b from the titanium substrate 3A.

2-4. Film Formation Step S4

Next, a film formation step S4 is performed. In the film formation step S4, a conductive carbon film 3e is formed on at least the projecting portions 31A and 32A of the titanium substrate 3A after the etching process step S3 (see FIG. 8). This ensures obtaining the separator 3.

In forming the conductive carbon film 3e, physical vapor deposition (PVD) that uses, for example, vacuum evaporation, sputtering, ion plating, and ion beam mixing, may form the conductive carbon film 3e or chemical vapor deposition (CVD) that uses, for example, plasma treatment may form the conductive carbon film 3e.

In this embodiment, the conductive carbon film 3e is Ruined by plasma CVD using a film formation device (not illustrated). Specifically, after the titanium substrate 3A is introduced in a film formation chamber (not illustrated), a DC bias voltage is applied to generate glow discharge plasma between the titanium substrate 3A and a positive electrode (not illustrated). In this embodiment, the positive electrode is disposed so as to be parallel to the titanium substrate 3A and oppose both surfaces to simultaneously generate the plasma on both surfaces. Next, a hydrocarbon gas, such as an acetylene gas, is introduced in the film formation chamber, and ionized carbon is adsorbed on the exposed surface of the titanium carbide layer 3d. This causes the carbon to grow on the surface of the titanium carbide layer 3d on the surface of the titanium substrate 3A, and thus, the conductive carbon film 3e made of the amorphous carbon can be obtained.

Thus, the conductive carbon film 3e can be formed on both surfaces of the titanium substrate 3A including the projecting portions 31A and 32A. While the thickness of the conductive carbon film 3e is not limited, it is, for example, 10 to 80 nm thick. For example, when the film thickness of the conductive carbon film 3e is less than 10 nm, the corrosion resistance of the separator decreases, and thus, the resistance increases in some cases. Meanwhile, when the film thickness of the conductive carbon film 3e exceeds 80 nm, an internal stress of the conductive carbon film 3e increases, and thus, the conductive carbon film 3e is peeled off of the titanium substrate 3A in some cases.

In this embodiment, binding between the carbon of the titanium carbide layer 3d formed by the heat treatment and the carbon of the conductive carbon film 3e becomes strong, thereby ensuring an improved sticking force between the titanium carbide layer 3d and the conductive carbon film 3e. This ensures a close contact state between the titanium carbide layer 3d and the conductive carbon film 3e even when the separator 3 is exposed to a generated water generated when the fuel cell 10 generates an electric power. As a result, the contact resistance of the separator 3 to the power generation unit 2 can be restrained from increasing, thereby ensuring a reliability of the separator 3.

EXAMPLE

The following describes the embodiment based on a example.

Example

A test object corresponding to a separator according to the example was manufactured by the method described below. First of all, a titanium plate (rolled material) having a thickness of 0.1 mm made of pure titanium (material: Japanese Industrial Standard type 1) (corresponding to grade 1 of ASTM) was formed into a shape of a separator having a predetermined size so as to make a titanium substrate. Cleaning was performed using an alkaline-based cleaning fluid.

Figure 9A:
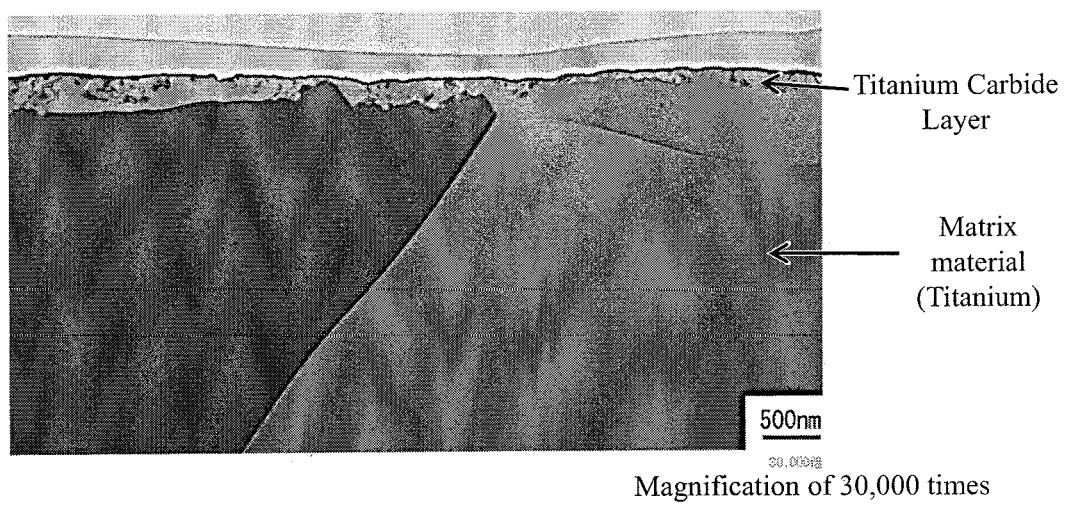
FIG. 9A is a cross-sectional photograph of a titanium substrate according to a example.
Figure 9B:
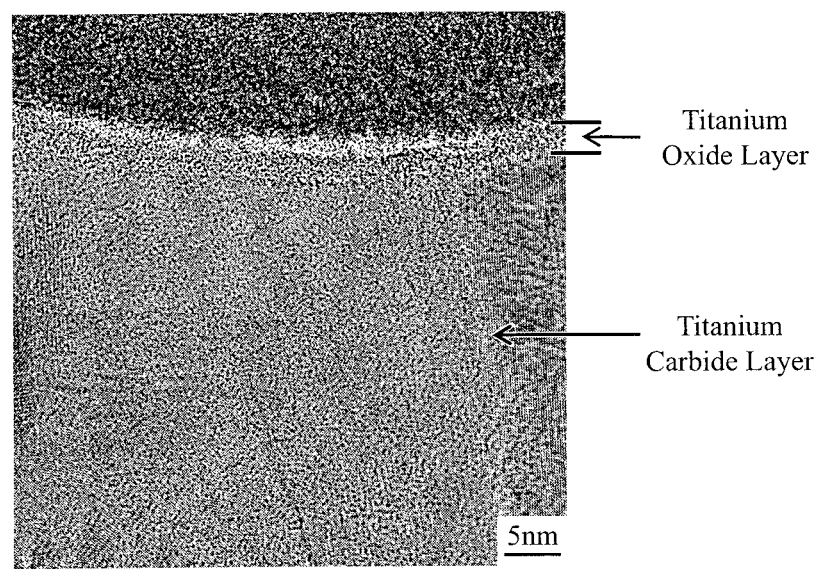
FIG. 9B is an enlarged cross-sectional photograph of the titanium substrate in FIG. 9A.

Next, the carbon sheets were alternately stacked on the titanium substrates, and then, put into the heating furnace. A pressure inside the furnace was vacuumed so as to be $10^{-6}$ Pa. Then, the heat treatment was performed on the titanium substrates under the heating condition of at 600° C. for two hours. A cross-sectional surface of the obtained titanium substrate was observed with a transmission electron microscope (TEM). This result is illustrated in FIG. 9A and FIG. 9B. FIG. 9A is a cross-sectional photograph of the titanium substrate according to the example. FIG. 9B is an enlarged cross-sectional photograph of the titanium substrate in FIG. 9A.

The titanium substrate after the heat treatment was introduced in the film formation device, the pressure inside the film formation chamber was set 10 Pa, and the temperature inside the film formation chamber was set 300° C. Then, the DC bias voltage of 2.0 kV in DC was applied to the titanium substrate to generate the glow discharge plasma between the titanium substrate 3A and the positive electrode. In this state, the argon gas is supplied into the chamber to bring the argon turned into plasma in contact with the surface of the titanium substrate, and thus, the etching process of the titanium substrate was performed.

Figure 11:
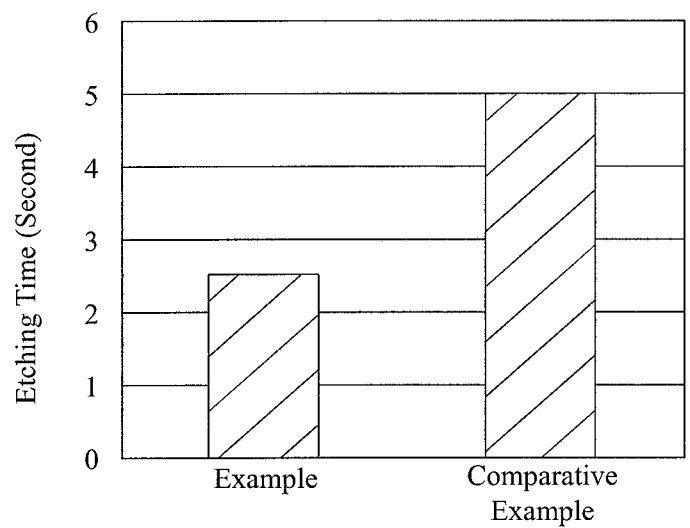
FIG. 11 is a graph illustrating etching times of the titanium substrates according to the example and the comparative example.

It should be noted that the etching process was performed until the passive film (titanium oxide layer) formed on the surface of the titanium substrate was completely removed, and the time was measured. This result is illustrated in FIG. 11. FIG. 11 is a graph that illustrates etching times of the titanium substrates according to the example and a comparative example described later.

Next, the hydrocarbon gas (acetylene gas) was supplied in the chamber of the film formation device as the film formation gas, the DC bias voltage was applied so as to fall within a range of 2.0 to 3.0 kV in DC, and the conductive carbon film was formed by the plasma CVD. This obtained the test object corresponding to the fuel cell separator.

Comparative Example

Figure 10A:
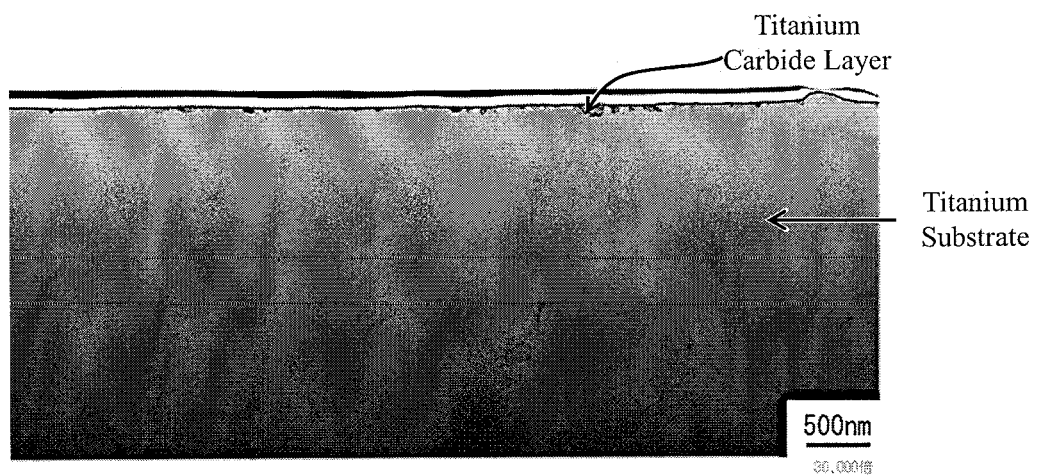
FIG. 10A is a cross-sectional photograph of a titanium substrate according to a comparative example.
Figure 10B:
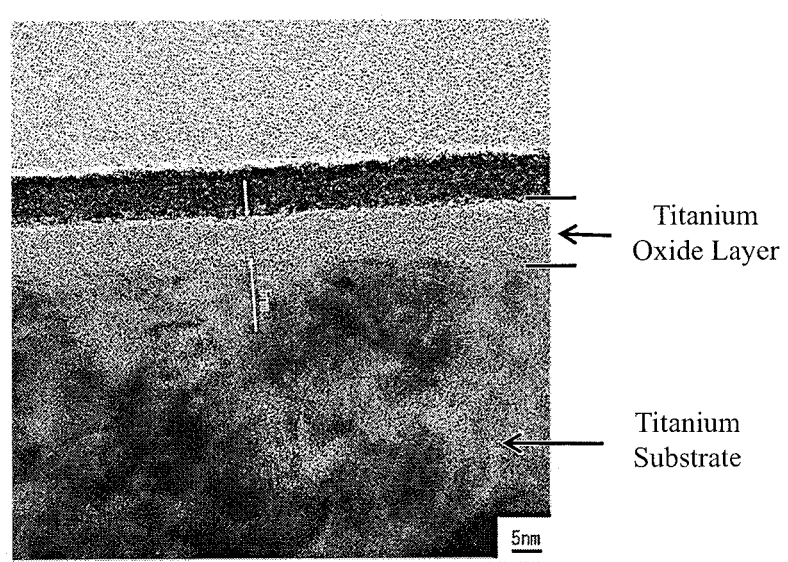
FIG. 10B is an enlarged cross-sectional photograph of a portion where a titanium carbide is not formed on the titanium substrate in FIG. 10A.
Figure 10C:
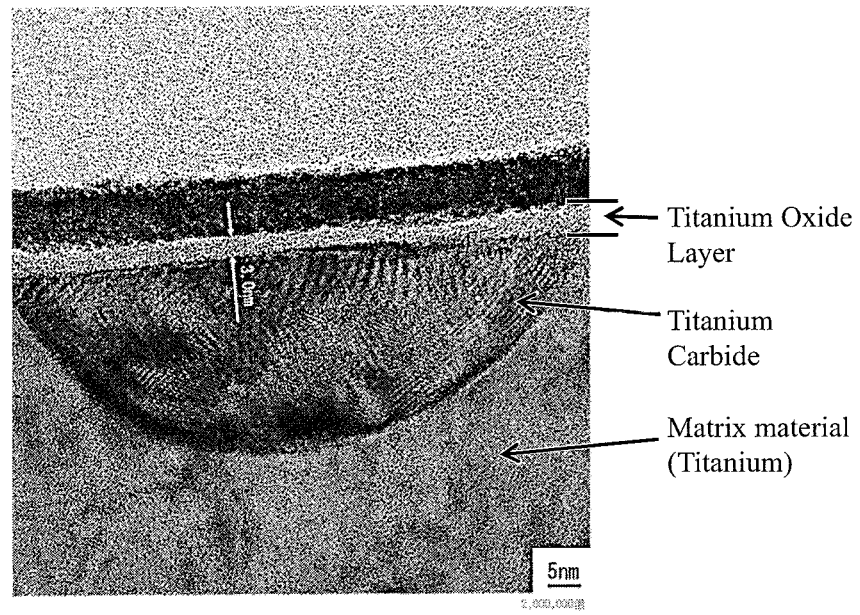
FIG. 10C is an enlarged cross-sectional photograph of a portion where the titanium carbide is formed on the titanium substrate in FIG. 10A.

A test object was manufactured similarly to the example. The comparative example is different from the example in that the heat treatment was not performed using the carbon sheets. It should be noted that the cross-sectional surface of the titanium substrate before the etching process was observed with the transmission electron microscope (TEM). This result is illustrated in FIG. 10A to FIG. 10C. FIG. 10A is a cross-sectional photograph of the titanium substrate according to the comparative example. FIG. 10B is an enlarged cross-sectional photograph of a portion where the titanium carbide is not formed on the titanium substrate in FIG. 10A. FIG. 10C is an enlarged cross-sectional photograph of a portion where the titanium carbide is formed on the titanium substrate in FIG. 10A. Also in the case with the comparative example, the etching process was performed until the passive film (titanium oxide layer) formed on the surface of the titanium substrate was completely removed, and the time was measured. This result is illustrated in FIG. 11.

<Corrosion Durability Test>

The test objects according to the example and the comparative example were subjected to a corrosion resistance test (constant potential corrosion test) in accordance with an electrochemical high temperature corrosion test method (JIS Z2294) for metal materials specified in Japanese Industrial Standards. The test objects were immersed in a sulfuric acid solution (300 ml, pH3) adjusted to a temperature of 80° C. with a temperature controlling water in an atmosphere release type device. Electrically coupling a counter electrode made of a platinum plate to the test objects (sample pole) in this state caused an electric potential difference of 0.9 V between the counter electrode and the sample pole, and thus, the test objects were corroded. It should be noted that, the electric potential of the test objects were held constant with a reference electrode. The test period was approximately 50 hours.

<Contact Resistance Test>

Figure 12:
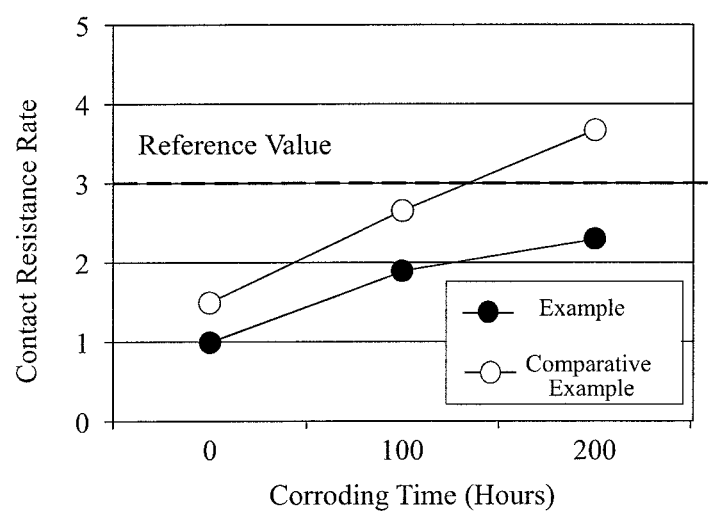
FIG. 12 is a graph illustrating relationships between corroding times and contact resistance ratios of test objects according to the example and the comparative example.

A contact resistance test was performed on the test objects according to the example and the comparative example before the corrosion test (beginning), at 100 hours in the corrosion test, and at 200 hours in the corrosion test. Specifically, a carbon paper (0.5 mm thick) corresponding to the diffusion layer of the fuel cell was placed on each of the test objects, and a measurement was taken while a constant load (1 MPa) was added with a measuring tool. In this state, a current from a power source was adjusted and flown such that the current flown to the test objects become 1 A with an ammeter, the voltage applied to the test objects was measured with a voltmeter, and contact resistance values between the test objects and the carbon paper were calculated. Specifically, respective contact resistance ratios were calculated with the contact resistance value before the corrosion test of the example is set 1. This result is illustrated in FIG. 12. FIG. 12 is a graph illustrating a relationship between corroding times and contact resistance ratios of the test objects according to the example and the comparative example.

Result and Consideration

As illustrated in FIG. 9A and FIG. 9B, the titanium carbide layer was formed on the surface of the matrix material of the titanium substrate of the example on which the heat treatment was performed with the carbon sheet brought in contact, and the passive film was formed on the surface of the titanium carbide layer.

Meanwhile, as illustrated in FIG. 10A to 10C, the titanium carbide partially existed on the surface of the matrix material of the titanium substrate on which the heat treatment was not performed like the example, and the passive film was formed to cover these. The film thickness of the passive film (see FIG. 10B) that coated a portion where the titanium carbide was not formed was thicker than the film thickness of the passive film (see FIG. 10C) that coated a portion where the titanium carbide was formed and the film thickness of the passive film of the example.

It should be noted that, as is clear from FIG. 10A to FIG. 10C, while it is considered that the titanium carbide is locally formed on the surface of the matrix material of the titanium substrate before the heat treatment is performed on the titanium substrate of the example, it is considered that performing the heat treatment like the example formed the titanium carbide layer with a uniform thickness on the whole surface where the carbon sheet was in contact with the surface of the titanium substrate.

As illustrated in FIG. 11, the etching time of the titanium substrate according to the example was shorter than the etching time of the titanium substrate according to the comparative example. It is considered that this is due to the film thickness of the passive film formed on the titanium substrate according to the example being thinner than that of the comparative example. From the above, it is considered that forming the titanium carbide layer by bringing the carbon sheet in contact with the titanium substrate and diffusing the carbon of the carbon sheet in the titanium substrate like the example thins the thickness of the passive film on a surface layer of the titanium substrate.

As illustrated in FIG. 12, the contact resistance ratio of the test object of the example was smaller than that of the comparative example in any case. It is considered that this is due to the formation of the conductive carbon film on the titanium carbide layer in the test object of the example strongly binding the carbon of the titanium carbide layer to the carbon of the conductive carbon film. As a result, the test object of the example is considered to have a high close contactness between the titanium substrate and the conductive carbon film and a high corrosion durability compared with that of the comparative example.

While one embodiment of the present disclosure has been described in detail above, the present disclosure is not limited to the above-described embodiment, and can be subjected to various kinds of changes of design without departing from the spirit of the present disclosure described in the claims.

In this embodiment, while the heat treatment is performed with the carbon sheets and the titanium substrates (separator forming material) being alternately stacked in the heat treatment step, the heat treatment may be performed with the carbon sheets interposed in one titanium substrate.

DESCRIPTION OF SYMBOLS

2 MEGA (power generation unit)
3 Separator (Fuel cell separator)
3A Titanium substrate
3a Matrix material
3b Passive film
3d Titanium carbide layer
3e Conductive carbon film
9 Carbon sheet
6 Electrode
21, 22 Gas flow channel
21A Recessed portion
31, 32 Contact portion
31A, 32A Projecting portion

What is claimed is:

1. A method for manufacturing a fuel cell separator, the fuel cell separator including a contact portion that is in contact with a power generation unit so as to partition the power generation units including electrodes of a fuel cell, the fuel cell separator having a conductive carbon film formed on the contact portion, the method comprising:
preparing one or more titanium substrates having a plurality of projecting portions and recessed portions for gas flow channels as a substrate of the separator, the projecting portions being formed corresponding to a shape of the contact portion, the recessed portions being formed between the projecting portions;
performing a heat treatment on the one or more titanium substrates in a state where one or more carbon sheets is brought in contact with the projecting portions such that carbon in the one or more carbon sheets diffuses in the projecting portions to form a titanium carbide layer;
removing, from the one or more titanium substrates after the performing the heat treatment, the one or more carbon sheets previously brought in contact with the projecting portions; and
forming the conductive carbon film on the projecting portions after the removing the one or more carbon sheets, wherein the conductive carbon film is formed on the projecting portions using physical vapor deposition (PVD) or chemical vapor deposition (CVD).

2. The method for manufacturing the fuel cell separator according to claim 1, further comprising
etching the projecting portions, after the removing the one or more carbon sheets previously brought in contact with the projecting portions and before the forming the conductive carbon film, so as to remove passive films of titanium oxide formed on surfaces of the projecting portions.

3. The method for manufacturing the fuel cell separator according to claim 1,
wherein the preparing the one or more substrates includes forming the one or more titanium substrates by a presswork.

4. The method for manufacturing the fuel cell separator according to claim 1,
wherein the heat treatment is performed in a state where the titanium substrates and the carbon sheets are alternately stacked in the performing the heat treatment.

* * * * *